(12) United States Patent
Huang

(10) Patent No.: US 8,818,136 B2
(45) Date of Patent: Aug. 26, 2014

(54) IMAGE INTERPOLATION METHOD BASED ON MATRIX AND IMAGE PROCESSING SYSTEM

(75) Inventor: Xiaodong Huang, Shanghai (CN)

(73) Assignee: Montage Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/376,995

(22) PCT Filed: Mar. 18, 2011

(86) PCT No.: PCT/CN2011/071966
§ 371 (c)(1),
(2), (4) Date: Dec. 8, 2011

(87) PCT Pub. No.: WO2012/106850
PCT Pub. Date: Aug. 16, 2012

(65) Prior Publication Data
US 2013/0322780 A1    Dec. 5, 2013

(30) Foreign Application Priority Data

Feb. 12, 2011 (CN) .......................... 2011 1 0037074

(51) Int. Cl.
*G06K 9/32*    (2006.01)
*G06T 3/40*    (2006.01)
*H04N 7/46*    (2006.01)
*G06T 5/00*    (2006.01)
*H04N 7/26*    (2006.01)

(52) U.S. Cl.
CPC ............... *G06T 5/001* (2013.01); *G06T 3/4007* (2013.01); *H04N 19/00757* (2013.01); *H04N 19/00266* (2013.01); *H04N 19/00127* (2013.01)
USPC ...................................................... 382/300

(58) Field of Classification Search
USPC ...................................................... 382/300
See application file for complete search history.

(56) References Cited

U.S. PATENT DOCUMENTS

| | | | | |
|---|---|---|---|---|
| 5,638,070 | A * | 6/1997 | Kuwaoka ......................... | 341/95 |
| 6,072,505 | A * | 6/2000 | Piazza et al. ................... | 345/501 |
| 6,377,265 | B1 * | 4/2002 | Bong ............................. | 345/505 |
| 2002/0118213 | A1 * | 8/2002 | Yoshioka et al. .............. | 345/606 |
| 2003/0117404 | A1 * | 6/2003 | Yamashita ..................... | 345/531 |
| 2009/0322749 | A1 * | 12/2009 | Kassab et al. ................. | 345/424 |
| 2010/0172554 | A1 * | 7/2010 | Kassab et al. ................. | 382/128 |
| 2012/0166162 | A1 * | 6/2012 | Hartmann ........................ | 703/2 |

* cited by examiner

*Primary Examiner* — Jingge Wu
(74) *Attorney, Agent, or Firm* — Ming Chow; Sinorica, LLC

(57) ABSTRACT

The present invention relates to an image interpolation method based on matrix and an image processing system. The image processing system first determines a gradient direction of an image region formed by a pixel dot array containing an interpolation point, and then based on the gradient direction and a position of the interpolation point, determines a triangle for interpolation in the image region formed with the pixel dot array, and finally, based on pixel values of pixel dots corresponding to three vertexes of the determined triangle and a distance from the interpolation point to a vertex of the triangle, calculates a pixel value of the interpolation point. Thus, the problem of edge jag or sawteeth of details in an oblique direction of a zoomed image is effectively solved, and a high-quality image is obtained. Furthermore, for the method the calculation is simple, and the computation load is light.

12 Claims, 8 Drawing Sheets

IMAGE INTERPOLATION METHOD BASED ON MATRIX AND IMAGE PROCESSING SYSTEM

BACKGROUND OF THE PRESENT INVENTION

1. Field of Invention

The present invention relates to the field of image processing, and in particular, to an image interpolation method based on matrix and an image processing system.

2. Description of Related Arts

Video/image zooming is widely applied in television and multimedia industries. In this field, most of the video/image scaling algorithms are based on polyphase interpolation filtering. In this type of algorithms, polyphase filtering interpolation is performed among pixels, in which horizontal direction interpolation is first performed, and then vertical direction interpolation is performed, or vertical direction interpolation is first performed, and then horizontal direction interpolation is performed. However, the problem of edge jag or sawteeth of details in an oblique direction of the image occurs; moreover, polyphase interpolation is implemented through many multiplication operations which results in high computation complexity.

Dan Su et al set forth the triangle interpolation theory (see "Image Interpolation by Pixel-Level Data-Dependent Triangulation", Computer Graphics Forum Volume 23, Issue 2, pages 189-201); however, how to apply the theory in practice is still an issue to be solved by those skilled in the art.

SUMMARY OF THE PRESENT INVENTION

In view of the disadvantages in the prior art, an object of the present invention is to provide an image interpolation method based on matrix and an image processing system.

In order to achieve the objectives as above, the image interpolation method based on matrix provided by the present invention comprises steps of:

(A) determining a gradient direction of an image region formed by a pixel dot array containing an interpolation point;

(B) determining a triangle for interpolation in the image region based on the gradient direction and position of the interpolation point; and (C) calculating the pixel value of the interpolation point based on the pixel values of pixel dots corresponding to three vertexes of the determined triangle and the distance between the interpolation point and one of three vertexes of the determined triangle.

In addition, the present invention further provides an image interpolation system based on matrix comprising:

a gradient determination module, for determining a gradient direction of an image region formed by a pixel dot array containing an interpolation point;

a triangle determination module, for determining a triangle for interpolation in the image region based on the gradient direction and the position of the interpolation point; and a calculation module, for calculating a pixel value of the interpolation point based on pixel values of pixel dots corresponding to three vertexes of the triangle for interpolation and a distance from the interpolation point to one vertex of the triangle.

In view of the above, in the image interpolation method based on matrix and the image processing system according to the present invention, through analysis of the pixel dot array containing the interpolation point, the gradient direction of the pixel dot array is obtained, and the triangle for interpolation is determined according to the gradient direction, and thus the pixel value of the interpolation point is calculated. Thus, edge jags or sawteeth of details in an oblique direction of a zoomed image is effectively prevented, and thus a high-quality image is obtained. Furthermore, the method according to the present invention achieves high computational efficiency both in time and memory because of simple calculation and reduced computational load.

DETAILED DESCRIPTION OF THE PREFERRED EMBODIMENTS

The present invention is further explained in detail according to the accompanying drawings. It should be noted that figures are schematic representations of the embodiments, and not drawn to scale.

Figure 1:
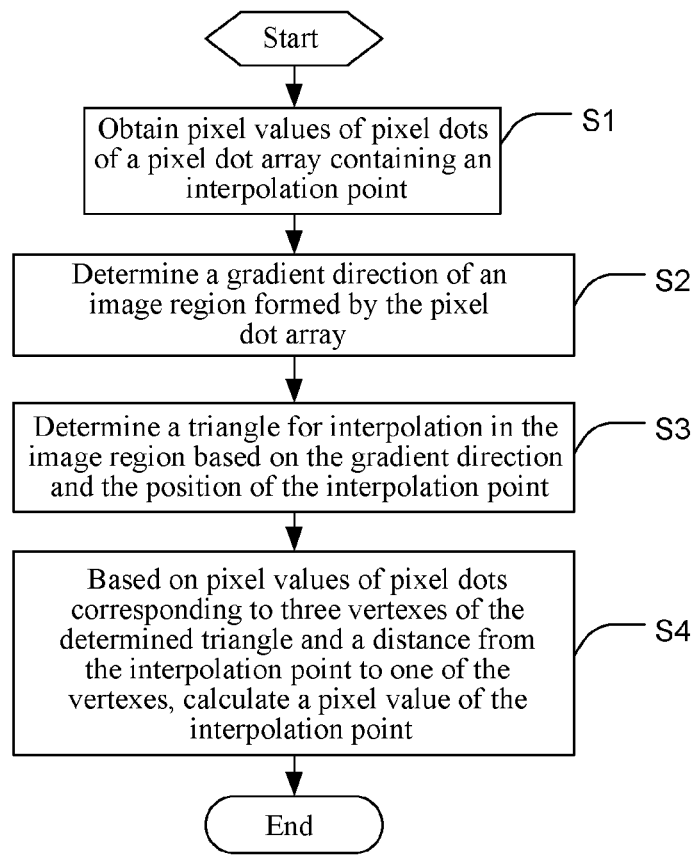
FIG. 1 is a flow chart of an image interpolation method based on matrix in an image processing system according to an embodiment of the present invention.

FIG. 1 is a flow chart of an image interpolation method based on matrix in an image processing system according to an embodiment of the present invention.

Figure 2:
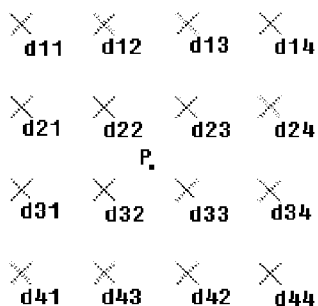
FIG. 2 is a schematic view of a pixel array containing an interpolation point.

First, in Step S1, the image processing system obtains pixel values of pixel dots of a pixel dot array containing an interpolation point. For example, the image processing system may obtain pixel values of 16 pixel dots of a 4×4 pixel dot array. As shown in FIG. 2, the image processing system obtains pixel values of pixel dots d11, d12, d13, d14, d21, d22, d23, d24, d31, d32, d33, d34, d41, d42, d43 and d44 in a 4×4 pixel dot array containing an interpolation point P.

Those skilled in the art should understand that the image processing system is not limited to obtain the pixel values of a 4×4 pixel dot array, and in fact, the image processing system may also obtain the pixel values of a 5×5, an 8×8 pixel dot array or other kinds of pixel dot arrays.

In Step S2, the image processing system determines a gradient direction of an image region formed by the pixel dot array containing the interpolation point. For example, the image processing system determines a gradient direction of an image region, which contains the interpolation point P, formed by the pixel dots d11, d12, d13, d14, d21, d22, d23, d24, d31, d32, d33, d34, d41, d42, d43 and d44, such as the diagonal direction formed by the pixel dots d11, d22, d33 and d44, or the diagonal direction formed by the pixel dots d14, d23, d32 and d41.

Next in Step S3, the image processing system determines a triangle for interpolation in the image region formed by the pixel dot array based on the gradient direction and the position of the interpolation point. For example, if the gradient direction is the direction of the diagonal formed by the pixel dots d11, d22, d33 and d44, the image processing system determines that a triangle formed by the pixel dots d32, d22 and d33 as the triangle for interpolation according to the position of the interpolation point P, which is in the triangle formed by the pixel dots d32, d22 and d33, for instance. Another example, if the gradient direction is the diagonal direction formed by the pixel dots d14, d23, d32 and d41, the image processing system selects a triangle formed by the pixel dots d22, d23 and d32 as the triangle for interpolation according to the position of the interpolation point P, which is in the triangle formed by the pixel dots d22, d23 and d32, for instance.

In Step S4, the image processing system calculates the pixel value of the interpolation point based on the pixel values of pixel dots corresponding to three vertexes of the determined triangle for interpolation and the distance from the interpolation point to one of the three vertexes of the triangle. For instance, if the image processing system determines the triangle formed by d22, d23 and d32 as the triangle for interpolation, the image processing system calculates the pixel value of the interpolation point P according to the distance between the interpolation point P and the pixel dot d22. Moreover, those skilled in the art should understand that the image processing system may also calculate the pixel value of the interpolation point P based on the distance between the interpolation point P and the pixel dot d23 or d32.

Figure 3:
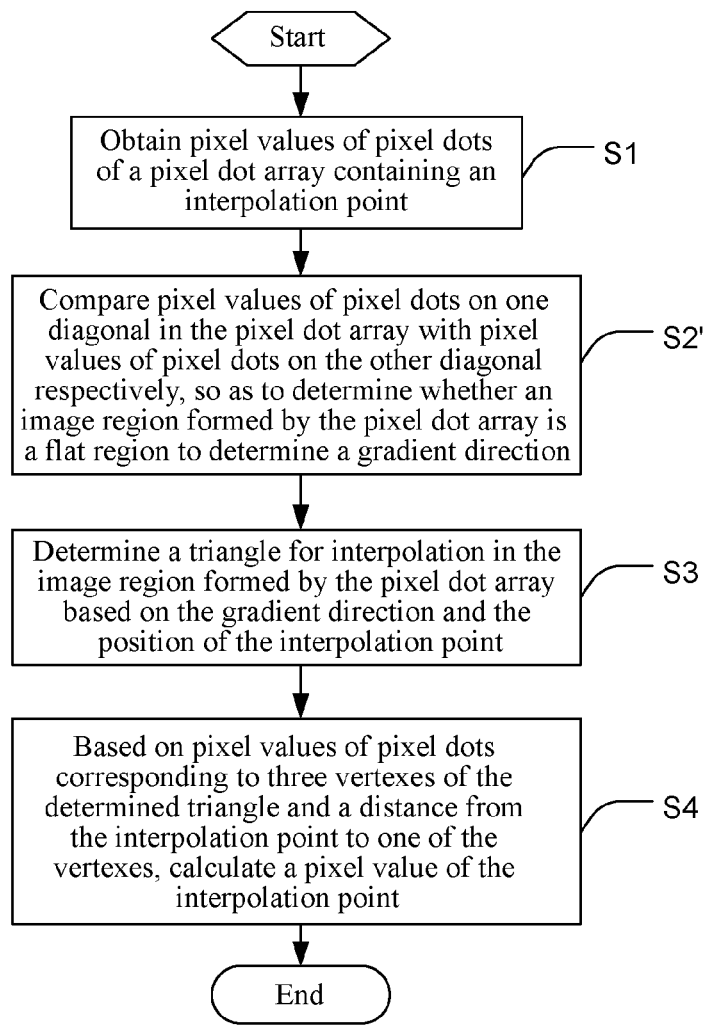
FIG. 3 is a flow chart of an image interpolation method based on matrix in an image processing system according to another embodiment of the present invention.

FIG. 3 is a flow chart of an image interpolation method based on matrix in an image processing system according to another embodiment of the present invention.

Specifically, Step S1 has been described in detail in the embodiment shown in FIG. 1, which is included in this embodiment in the manner of reference, so the details will not be described again.

In Step S2', the image processing system compares the pixel value of each pixel dot on the same diagonal in the pixel dot array containing the interpolation point with the pixel value of corresponding pixel dot on the other diagonal respectively, so as to find out whether the image region formed by the pixel dot array is a flat region to further determine the gradient direction. For example, the image processing system compares the pixel values of two pixel dots d22 and d33 on one diagonal with the pixel values of two pixel dots d32 and d23 on the other diagonal respectively, so as to find out whether the image region formed by the pixel dot array is a flat region to determine the gradient direction.

Step S3 and Step S4 have been described in detail in the embodiment shown in FIG. 1, which are included in this embodiment in the manner of reference, so the details will not be described again.

Figure 4:
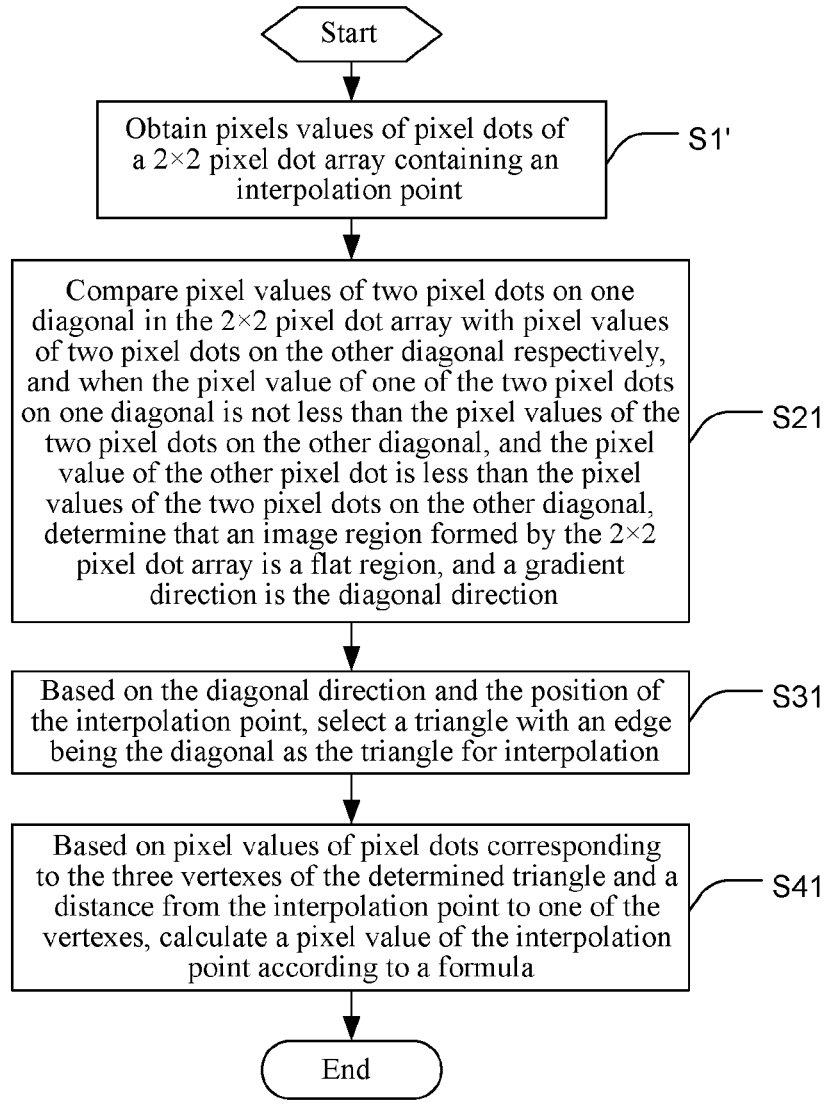
FIG. 4 is a flow chart of an image interpolation method based on matrix in an image processing system according to another embodiment of the present invention.

FIG. 4 is a flow chart of an image interpolation method based on matrix in an image processing system according to another embodiment of the present invention.

Specifically, in Step S1', the image processing system obtains pixel values of pixel dots contained in a 2×2 pixel dot array, in which an interpolation point is also contained. For example, as shown in FIG. 2, the 2×2 pixel dot array is formed by four pixel dots d22, d23, d32 and d33 adjacent to the interpolation point P.

In Step S21, the image processing system compares the pixel value of each of two pixel dots on the same diagonal, which are among the four pixel dots adjacent to the interpolation point, with the pixel values of two adjacent pixel dots on the other diagonal and adjacent to the interpolation point. If one of these two pixel dots has a pixel value not smaller than (i.e. larger than or equal to) the pixel values of its two adjacent pixel dots, moreover the other pixel of these two pixel dots has a pixel value smaller than its adjacent two pixel dots, the image processing system should determine that the image region formed by the four pixel dots is a flat region, and the gradient direction is the diagonal direction.

Step S21 could be more detailed illustrated by the following example.

For instance, it is set:
a=the pixel value of the pixel dot d22, c=the pixel value of the pixel dot d33,
b=the pixel value of the pixel dot d23, and d=the pixel value of the pixel dot d32,
the image processing system compares the pixel values a and c of the two pixel dots d22 and d33 on one diagonal with the pixel values b and d of the two pixel dots d23 and d32 on the other diagonal.

If a>=b && a>=d && c<=b && c<=d, or
a<=b && a<=d && c>=b && c>=d,
the image processing system determines that the image region formed by the four pixel dots is a flat region, and the gradient direction is the diagonal direction formed by the two pixel dots d22 and d33.

Moreover, if b>=a && b>=c && d<=a && d<=c, or
b<=a && b<=c && d>=a && d>=c,
the image processing system also determines that the image region formed by the four pixel dots is a flat region, and the diagonal direction formed by the two pixel dots d23 and d32 is determined as the gradient direction.

In Step S31, the image processing system selects a triangle, one of whose edges is the diagonal, as the triangle for interpolation, according to the position of the interpolation point and the diagonal determined as the gradient direction. For example, the image processing system determines the diagonal direction formed by the two pixel dots d22 and d33 as the gradient direction, so the image processing system could select the triangle formed by the pixel dots d32, d22 and d33 or the triangle formed by the pixel dots d23, d22 and d33 as the triangle for interpolation, and if the interpolation point P is located in the triangle region formed by the pixel dots d32, d22 and d33, the image processing system selects the triangle formed by the pixel dots d32, d22 and d33 as the triangle for interpolation. Another example, the image processing system determines the diagonal direction formed by the pixel dots d23 and d32 as the gradient direction, therefore the image processing system selects the triangle formed by the pixel dots d22, d23 and d32 or the triangle formed by the pixel dots d33, d23 and d32 as the triangle for interpolation, and if the interpolation point P is located in the triangle region formed by the pixel dots d22, d23 and d32, the image processing system selects the triangle formed by the pixel dots d22, d23 and d32 as the triangle for interpolation.

Figure 5:
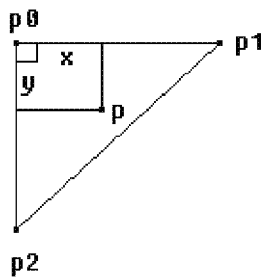
FIG. 5 is a schematic view of calculating a pixel value of an interpolation point according to an image interpolation method based on matrix in an image processing system of the present invention.

In Step S41, the image processing system calculates the pixel value of the interpolation point based on pixel values of pixel dots corresponding to the three vertexes of the determined triangle and the distance from the interpolation point to one vertex of the triangle. Preferably, as shown in FIG. 5, a pixel value zout of the interpolation point may be calculated according to the following formula:

$$zout=p0-(-p1+p0)*x-(p0-p2)*y,$$

wherein p0, p1, p2 are pixel values of pixel dots corresponding to three vertexes of the triangle for interpolation, x and y are a horizontal distance and a vertical distance from the interpolation point to the pixel dot having the pixel value of p0.

Figure 6:
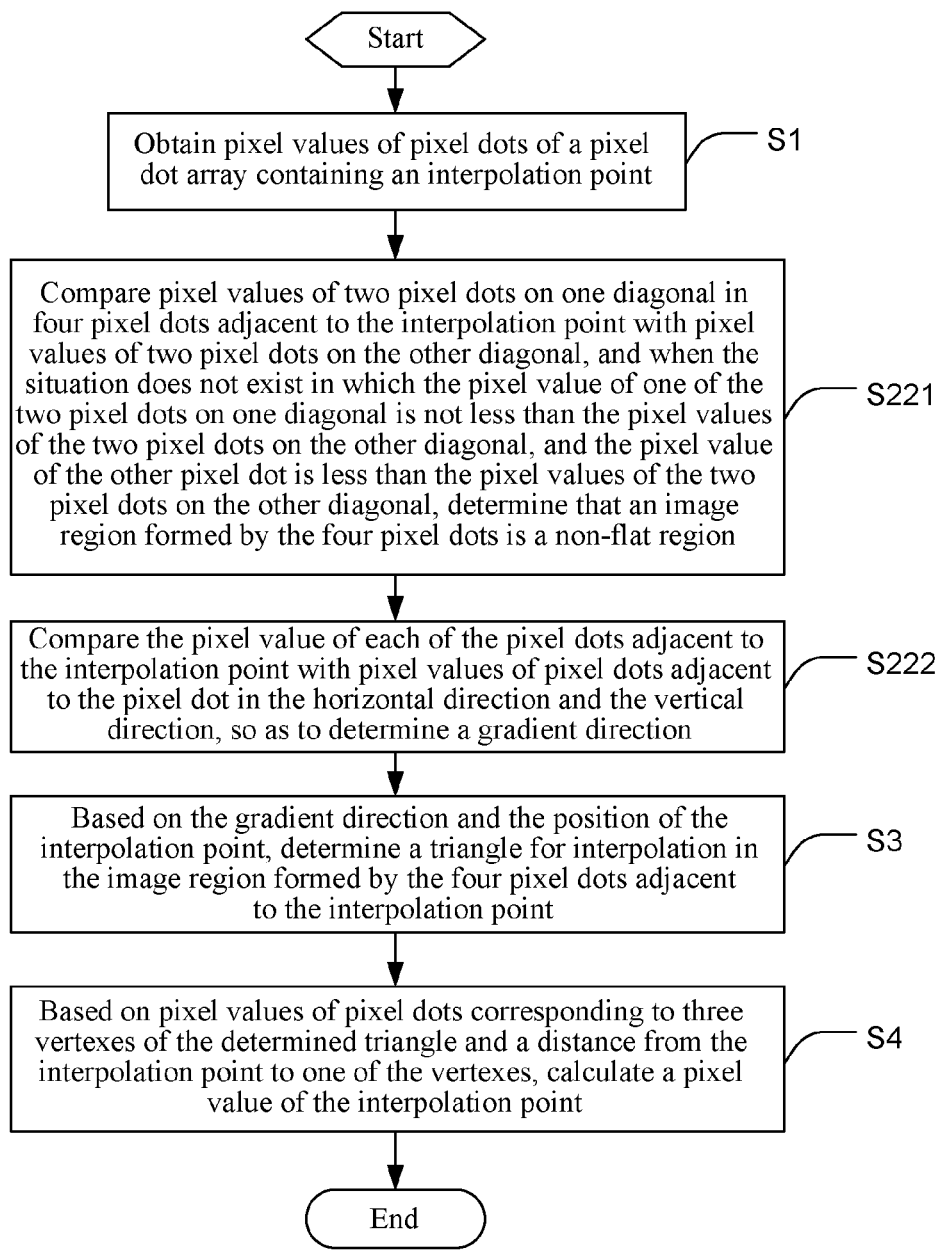
FIG. 6 is a flow chart of an image interpolation method based on matrix in an image processing system according to another embodiment of the present invention.

FIG. 6 is a flow chart of an image interpolation method based on matrix in an image processing system according to another embodiment of the present invention.

Specifically, Step S1 has been described in detail in the embodiment shown in FIG. 1, which is included in this embodiment in the manner of reference, so the details will not be described here.

In Step S221, the image processing system justifies that the condition, i.e. the pixel value of one of the two pixel dots on one diagonal is greater than the pixel values of two pixel dots on the other diagonal, and the pixel value of the other pixel dot is smaller than the pixel values of the two pixel dots on the other diagonal, is not met, the image processing system would determine that the image region formed by the four pixel dots is a non-flat region.

For example, it is still set a=the pixel value of the pixel dot d22, c=the pixel value of the pixel dot d33, b=the pixel value of the pixel dot d23, and d=the pixel value of the pixel dot d32, the image processing system determines that if none of the following conditions:

a>=b && a>=d && c<=b && c<=d, or;
a<=b && a<=d && c>=b && c>=d, or;
b>=a && b>=c && d<=a && d<=c, or;
b<=a && b<=c && d>=a && d>=c, can be satisfied, the image processing system determines that the image region formed by the four pixel dots is a non-flat region.

In Step S222, the image processing system determines the gradient direction by comparing the pixel value of each pixel dot adjacent to the interpolation point with the pixel values of pixel dots adjacent to the pixel dot both in the horizontal direction and the vertical direction respectively. For example, the image processing system compares the pixel value of each of the pixel dots d22, d23, d32 and d33 with pixel values of pixel dots adjacent to the pixel dot in the horizontal direction and the vertical direction to determine the gradient direction respectively.

Step S3 and Step S4 have been described in detail in the embodiment shown in FIG. 1, which are included in this embodiment in the manner of reference, so the details will not be described here.

Figure 7:
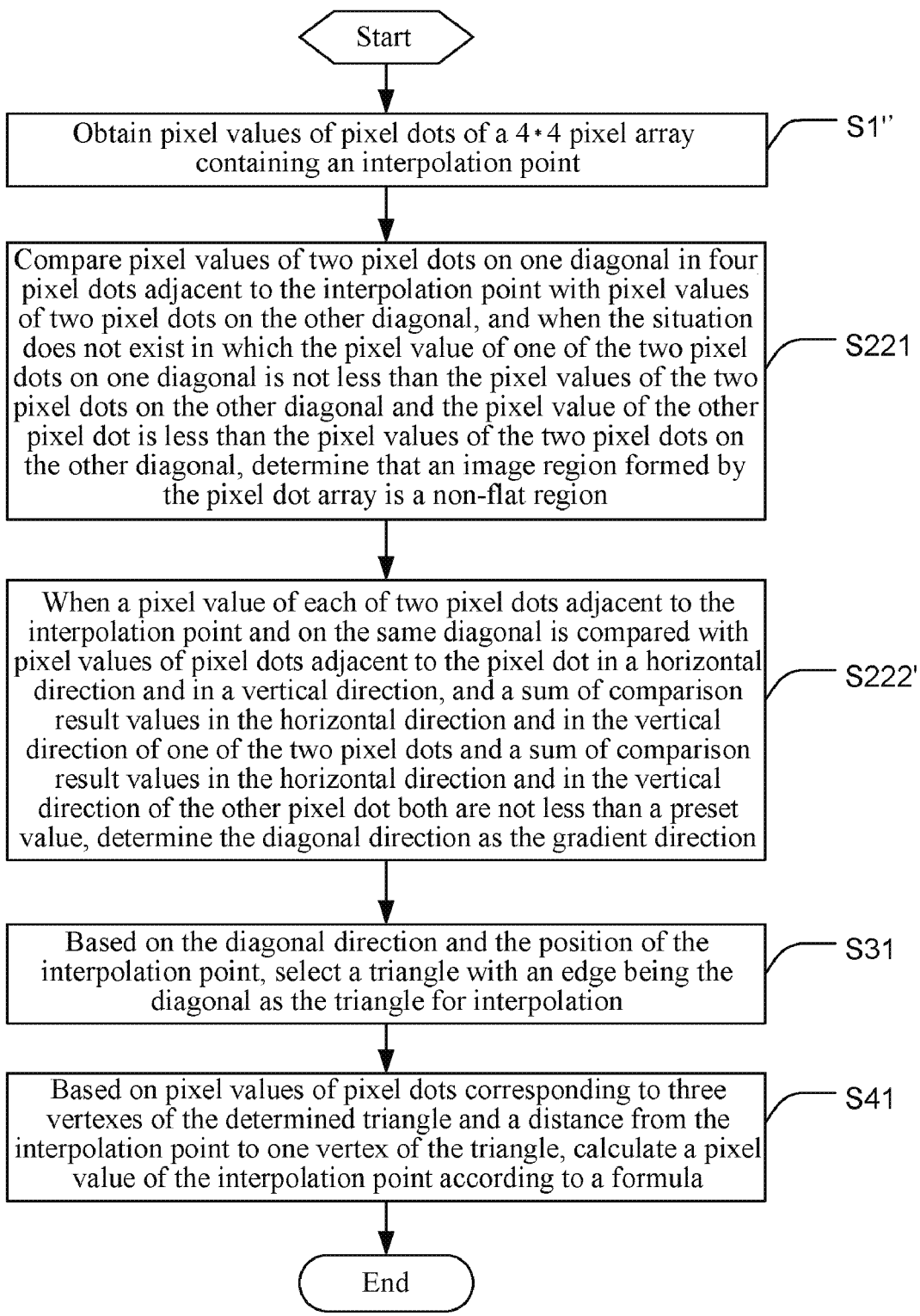
FIG. 7 is a flow chart of an image interpolation method based on matrix in an image processing system according to another embodiment of the present invention.

FIG. 7 is a flow chart of an image interpolation method based on matrix in an image processing system according to another embodiment of the present invention.

Specifically, in Step S1", the image processing system obtains pixel values of 16 pixel dots contained in a 4×4 pixel dot array, in which an interpolation point is contained. For example, as shown in FIG. 2, the image processing system obtains pixel values of pixel dots d11, d12, d13, d14, d21, d22, d23, d24, d31, d32, d33, d34, d41, d42, d43 and d44 in the 4×4 pixel dot array correlated to the interpolation point P.

Step S221 has been described in detail in the embodiment shown in FIG. 6, which is included in this embodiment in the manner of reference, so the details will not be described again.

In Step S222', the image processing system compares the pixel value of each of two pixel dots, which are both adjacent to the interpolation point on a same diagonal, with the pixel values of its specific adjacent pixel dots both in horizontal and vertical directions. Then the diagonal direction is determined to be the gradient direction if the comparison results demonstrate that the following condition is satisfied: the sum of the comparison result values in the horizontal and vertical directions of one of these two pixel dots and the sum of the comparison result values in the horizontal and vertical directions of the other pixel dot are both greater than a preset value.

For instance, it is defined that an extremum characteristic T is T(Ta, Tb, Tc), wherein Tb refers to the pixel value of the pixel dot X which is adjacent to the interpolation point, and Ta and Tc are defined as the pixel values of two adjacent pixel dots of pixel dot X in the horizontal direction and the vertical direction respectively.

If Ta>Tb && Tb<Tc, it is determined that the extremum characteristic T is a constant (that is, the comparison result value), for example, T=1; if Ta<Tb && Tb>Tc, it is determined that the extremum characteristic T is an negative value of the constant, for example, T=−1; and in other situations, it is determined that the extremum characteristic T=0.

Thus, the image processing system can obtain extremal eigenvalues, i.e. comparison result values both in the horizontal and vertical directions of the four pixel dots d22, d23, d32 and d33 which are adjacent to the interpolation point P according to the above definition. For example, as for the pixel dot d22, the image processing system can determine that the extremal eigenvalue of the pixel dot d22 in the horizontal direction is 1, −1 or 0 by comparing the pixel value of the pixel dot d22 with the pixel values of the pixel dots d21 and d23. Similarly, the image processing system can also determine the extremal eigenvalue of the pixel dot d22 in the vertical direction by comparing the pixel value of the pixel dot d22 with the pixel values of the pixel dots d12 and d32. As for the pixel dots d23, d32 and d33, the image processing system can also determine the extremal eigenvalues of the pixel dots in the horizontal direction and the vertical direction by comparison in the same manner.

Then, the image processing system determines whether the sum of the respective extremal eigenvalues in the horizontal and vertical directions for each one of the two pixel dots on the same diagonal is larger than a preset value, for example, 0. If the sums both are larger than the present value, the diagonal direction is determined as the gradient direction. For example, the extremal eigenvalues in the horizontal and vertical directions of the pixel dots d22, d23, d33 and d32 are respectively defined as infl_a_x, infl_a_y, infl_b_x, infl_b_y, infl_c_x, infl_c_y, infl_d_x and infl_d_y.

If infl_a>0 && infl_c>0, the image processing system determines the diagonal direction formed by the pixel dots d22 and d33 as the gradient direction, wherein infl_a=infl_a_x+infl_a_y, infl_c=infl_c_x+infl_c_y.

If infl_b>0 && infl_d>0, the image processing system determines the diagonal direction formed by the pixel dots d23 and d32 as the gradient direction, wherein infl_b=infl_b_x+infl_b_y, infl_d=infl_d_x+infl_d_y.

It should be understood by those skilled in the art that the comparison result values are merely used for illustrating the present invention, but not intended to limit the present invention. The preset value is determined based on the comparison result values, and when the comparison result values are not expressed as 1, −1 and 0, the preset value may not be 0 accordingly.

Step S31 and Step S41 have been described in detail in the embodiment shown in FIG. 4, which are included in this embodiment in the manner of reference, so the details will not be described again.

Figure 8:
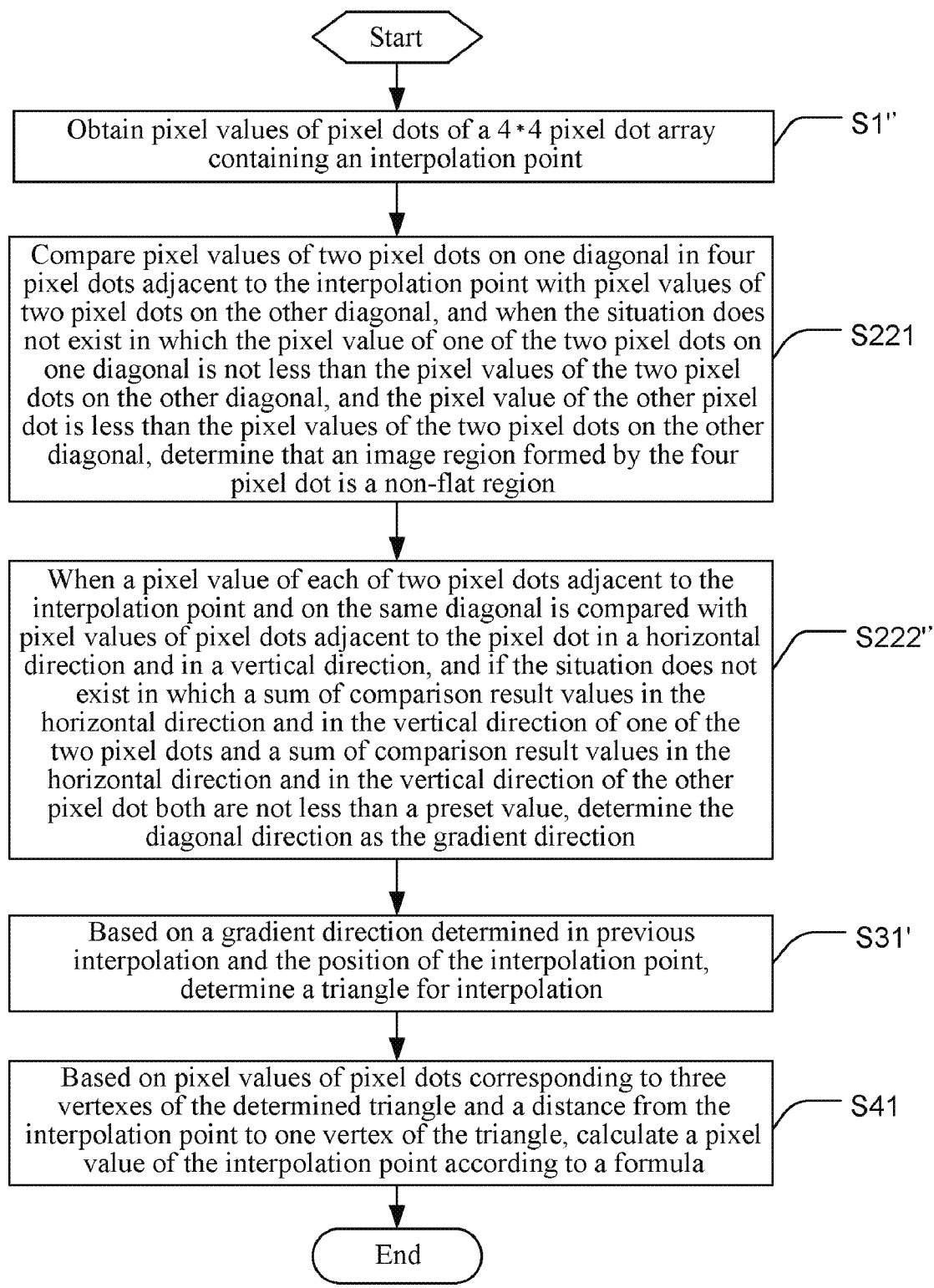
FIG. 8 is a flow chart of an image interpolation method based on matrix in an image processing system according to another embodiment of the present invention.

FIG. 8 is a flow chart of an image interpolation method based on matrix in an image processing system according to another embodiment of the present invention.

Specifically, Step S1'' and Step S221 have been described in detail in the embodiment shown in FIG. 7, which are included in this embodiment in the manner of reference, so the details will not be described again.

In Step S222'', after the comparison between the pixel value of each one from these two pixel dots, which are both adjacent to the interpolation point on a same diagonal, with the pixel values of its specific adjacent pixel dots both in horizontal and vertical directions, if the image processing system determines that the condition, i.e. the sum of the comparison result values in the horizontal and vertical directions of one of these two pixel dots and the sum of the comparison result values in the horizontal and vertical directions of the other pixel dot are both greater than a preset value, is not satisfied, the image processing system determines the current gradient direction based on a gradient direction determined in previous interpolation. If the interpolation is first interpolation of a row, preferably, the image processing system may directly determine the diagonal direction formed by the pixel dots d23 and d32 as the current gradient direction. For example, if the gradient direction determined in the previous interpolation is the diagonal direction where a starting pixel dot in an array formed by four pixel dots, the image processing system may determine the diagonal direction where the pixel dot d22 (that is, the starting pixel dot in the array) is located, i.e., the diagonal direction formed by the pixel dots d22 and d33, as the current gradient direction. If the gradient direction determined in the previous interpolation is the other diagonal direction, the image processing system determines the other diagonal, i.e. the diagonal direction formed by the pixel dots d23 and d32 as the current gradient direction.

In Step S31', the image processing system determines a triangle for interpolation based on the gradient direction determined in the previous interpolation and the position of the interpolation point. For example, the image processing system determines that the current gradient direction is the diagonal direction formed by the pixel dots d23 and d32 based on the gradient direction determined in the previous interpolation, and then, the image processing system selects a triangle containing the interpolation point P, that is, the triangle formed by the pixel dots d22, d23 and d32, based on the position of the interpolation point P, as the triangle for interpolation.

Step S41 has been described in detail in the embodiment shown in FIG. 4, which is included in this embodiment in the manner of reference, so the details will not be described again.

Figure 9:
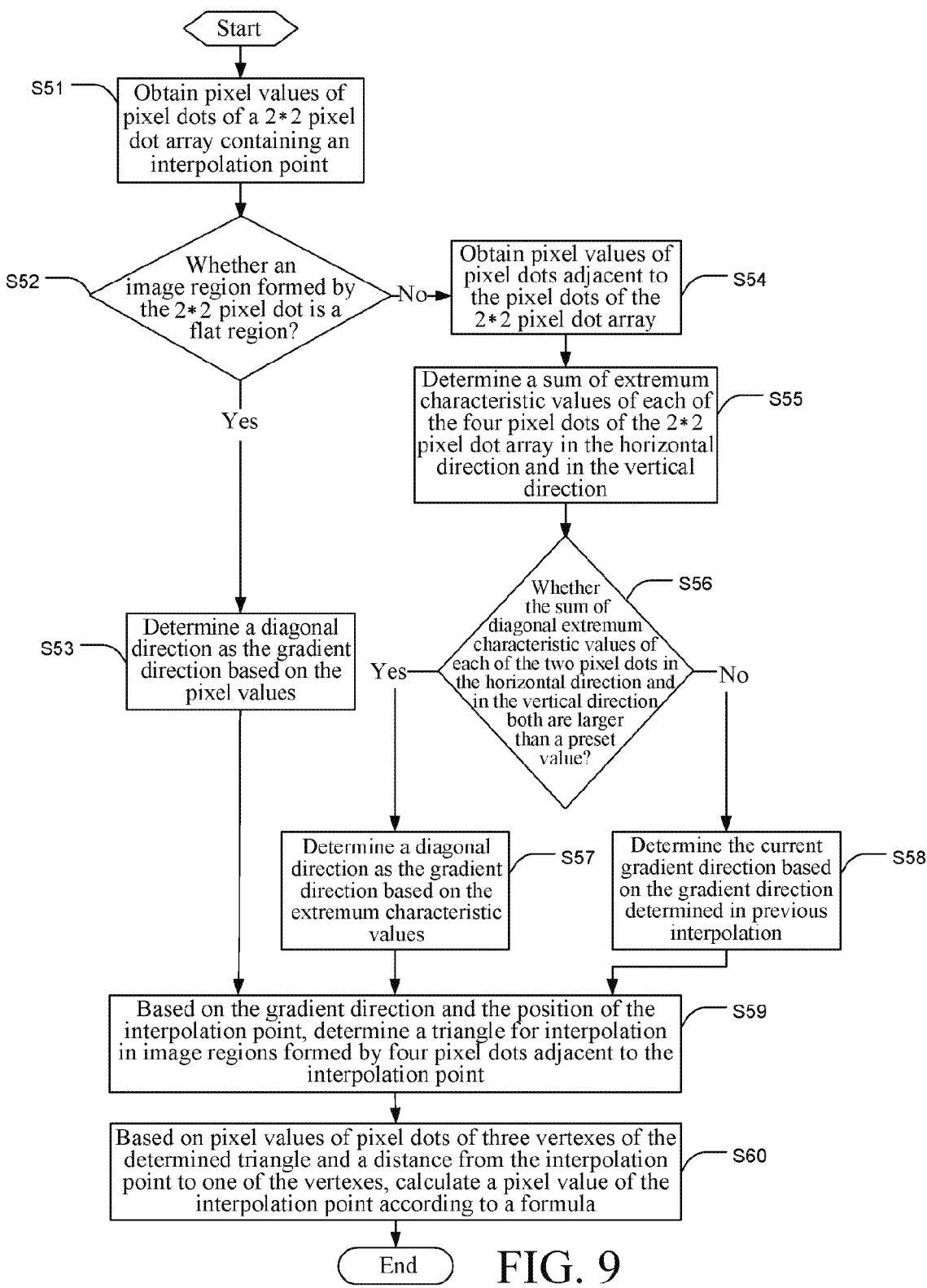
FIG. 9 is a flow chart of an image interpolation method based on matrix in an image processing system according to another embodiment of the present invention.

FIG. 9 is a flow chart of an image interpolation method based on matrix in an image processing system according to another embodiment of the present invention.

Specifically, in Step S51, the image processing system obtains pixel values of four pixel dots contained in a 2×2 pixel dot array. For example, the image processing system obtains the pixel values of the pixel dots d22, d23, d32 and d33.

In Step S52, the image processing system compares pixel values of two pixel dots located on the same diagonal with pixel values of pixel dots located on the other diagonal respectively, so as to determine whether the image region formed by the 2×2 pixel dot array is a flat region. The specific comparison process is the same as that in the embodiments shown in FIG. 3, FIG. 4 and FIG. 6, so the details will not be described again.

In Step S53, when the image processing system determines that the image region formed by the 2×2 pixel dot array is a flat region, the image processing system determines one diagonal direction as the gradient direction based on the pixel values of the four pixel dots, that is, if the pixel value of one of these two pixel dots on one diagonal is larger than the pixel values of two pixel dots adjacent to this specific pixel dot, and the pixel value of the other pixel dot is smaller than the pixel values of its two adjacent pixel dots, the image processing system will determine the diagonal direction as the gradient direction.

In Step S54, when the image processing system determines that the image region formed by the 2×2 pixel dot array is a non-flat region, the image processing system obtains the pixel values of pixel dots adjacent to the pixel dots in the 2×2 pixel dot array again, for example, obtains the pixel values of the pixel dots d12, d13, d21, d24, d31, d34, d43 and d44.

In Step S55, the image processing system determines extremal eigenvalues of the pixel dots in the 2×2 pixel dot array in the horizontal direction and the vertical direction, so as to obtain a sum of extremal eigenvalues of each of the pixel dots in the horizontal direction and in the vertical direction. As for the specific details, reference may be made to the description of the determining the extremal eigenvalues of the pixel dots in the embodiments shown in FIG. 6 to FIG. 8, and the details will not be described again.

In Step S56, the image processing system determines whether the sum of the extremal eigenvalues in horizontal and vertical directions for each one of the two pixel dots which are located on one diagonal is larger than the preset value.

In Step S57, when the image processing system determines that the sum of the extremal eigenvalues of each of the two pixel dots on one diagonal in the horizontal direction and in the vertical direction is larger than the preset value, the image processing system determines the diagonal direction as the gradient direction.

In Step S58, when the image processing system determines that the sum of the extremal eigenvalues of neither of the two pixel dots on one diagonal in the horizontal direction and in the vertical direction is larger than the preset value, the image processing system determines the current gradient direction based on the gradient direction determined in previous interpolation. As for the specific details, reference may be made to the description in the embodiment shown in FIG. 8, and the details will not be described again.

In Step S59, the image processing system determines the triangle for interpolation in the image region formed by the four pixel dots adjacent to the interpolation point based on the determined gradient direction and the position of the interpolation point. As for the specific details, reference may be made to the description in the embodiment shown in FIG. 4, FIG. 7 and FIG. 8, and the details will not be described again.

In Step S60, the image processing system calculates the pixel value of the interpolation point based on pixel values of pixel dots corresponding to three vertexes of the determined triangle and the distance from the interpolation point to one vertex of the triangle. As for the specific details, reference may be made to the description in the embodiments shown in FIG. 4, FIG. 7 and FIG. 8, and the details will not be described again.

Figure 10:
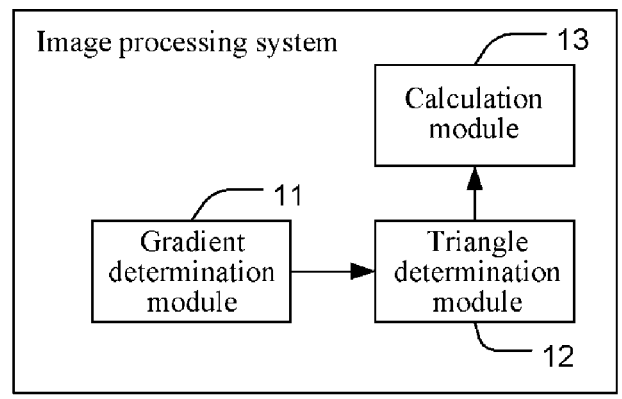
FIG. 10 is a schematic view of an image processing system for image interpolation based on matrix according to an embodiment of the present invention.

FIG. 10 is a schematic view of an image processing system for image interpolation based on matrix according to an embodiment of the present invention. The image processing system includes a gradient determination module 11, a triangle determination module 12 and calculation module 13.

The image processing system obtains pixel values of pixel dots of a pixel dot array containing an interpolation point, for instance, the image processing system may obtain pixel values of 16 pixel dots contained in a 4×4 pixel dot array, as shown in FIG. 2. The image processing system obtains pixel values of pixel dots d11, d12, d13, d14, d21, d22, d23, d24, d31, d32, d33, d34, d41, d42, d43 and d44 in a 4×4 pixel dot array containing an interpolation point P.

It should be understood by those skilled in the art that the image processing system is not limited to obtain the pixel values of a 4×4 pixel dot array, and in fact, the image processing system may also obtain the pixel values of a 2×2, an 8×8 pixel dot array and so on.

The gradient determination module 11 determines a gradient direction of an image region formed by the pixel dot array corresponding to an interpolation point. For example, the gradient determination module 11 determines a gradient direction of an image region formed by the pixel dots d11, d12, d13, d14, d21, d22, d23, d24, d31, d32, d33, d34, d41, d42, d43 and d44 containing the interpolation point P; another example, the diagonal direction formed by the pixel dots d14, d23, d32 and d41, or the diagonal direction formed by the pixel dots d11, d22, d33 and d44.

The triangle determination module 12 determines the triangle for interpolation in the image region formed by the pixel dot array based on the obtained gradient direction and the position of the interpolation point. For example, if the gradient determination module 11 determines the gradient direction is the diagonal direction formed by the pixel dots d11, d22, d33 and d44, the triangle determination module 12 determines the triangle formed by the pixel dots d32, d22 and d33 as the triangle for interpolation according to the position of the interpolation point P, for example, the interpolation point P is in the triangle formed by the pixel dots d32, d22 and d33. For example, if the gradient determination module 11 determines the gradient direction is the diagonal direction formed by the pixel dots d14, d23, d32 and d41, the triangle determination module 12 selects a triangle formed by the pixel dots d22, d23 and d32 as the triangle for interpolation according to the position of the interpolation point P, for example, the interpolation point P is in the triangle formed by the pixel dots d22, d23 and d32.

At last, the calculation module 13 calculates the pixel value of the interpolation point based on pixel values of pixel dots corresponding to three vertexes of the determined triangle and the distance from the interpolation point to one vertex of the triangle. For example, if the triangle determination module 12 determines the triangle formed by d22, d23 and d32 as the triangle for interpolation, the calculation module 13 calculates the pixel value of the interpolation point P according to the distance between the interpolation point P and the pixel dot d22. Moreover, persons skilled in the art should understand that the image processing system may also calculate the pixel value of the interpolation point P based on a distance between the interpolation point P and the pixel dot d23 or d32.

Figure 11:
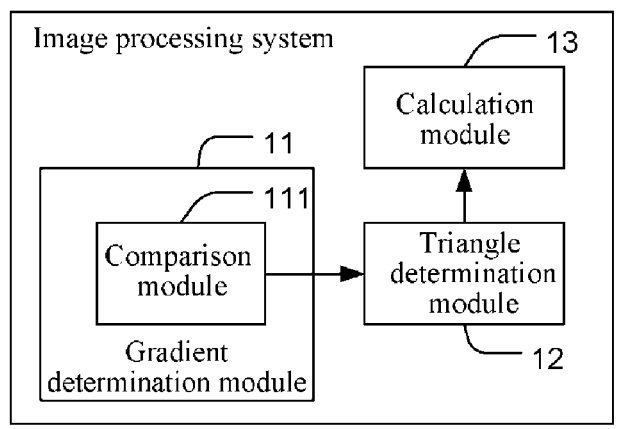
FIG. 11 is a schematic view of an image processing system for image interpolation based on matrix according to another embodiment of the present invention.

FIG. 11 is a schematic view of an image processing system for image interpolation based on matrix according to another embodiment of the present invention. The image processing system includes a gradient determination module 11, a triangle determination module 12 and a calculation module 13, and the gradient determination module 11 further includes a comparison module 111.

Specifically, the working process of the image processing system obtaining the pixel values of the pixel dots has been described in the embodiment shown in FIG. 10, which is included in this embodiment in the manner of reference, so the details will not be described again.

The comparison module 111 compares the pixel values of the pixel dots on one diagonal in the pixel dot array containing the interpolation point with the pixel values of the pixel dots on the other diagonal, so as to determine whether the image region formed by the pixel dot array is a flat region to further determine the gradient direction. For example, the comparison module 111 compares the pixel values of two pixel dots d22 and d33 on one diagonal with the pixel values of two pixel dots d32 and d23 on the other diagonal, so as to determine whether the image region formed by the pixel dot array is a flat region to determine the gradient direction.

The triangle determination module 12 and the calculation module 13 have been described in the embodiment shown in FIG. 10, which are included in this embodiment in the manner of reference, so the details will not be described again.

Hereinafter, the working process of image interpolation based on matrix according to another embodiment of the present invention is described based on the image processing system shown in FIG. 11.

Specifically, the image processing system obtains pixel values of pixel dots contained in a 2×2 pixel dot array, in which an interpolation point is contained. For example, as shown in FIG. 2, the 2×2 pixel dot array is formed by four pixel dots d22, d23, d32 and d33 adjacent to the interpolation point P.

The comparison module 111 compares a pixel value of each of two pixel dots on the same diagonal and among the four pixel dots adjacent to the interpolation point with pixel values of two pixel dots adjacent to the pixel dot, and when the pixel value of one of the two pixel dots on the same diagonal is not smaller than (that is, larger than or equal to) the pixel values of the two pixel dots adjacent to the pixel dot, and the pixel value of the other pixel dot is smaller than the pixel values of the two pixel dots adjacent to the pixel dot, the image processing system determines that the image region formed by the four pixel dots is a flat region, and the gradient direction is the diagonal direction.

For example, it is set a=the pixel value of the pixel dot d22, c=the pixel value of the pixel dot d33, b=the pixel value of the pixel dot d23, and d=the pixel value of the pixel dot d32, the comparison module 111 compares the pixel values a and c of the two pixel dots d22 and d33 on one diagonal with the pixel values b and d of the two pixel dots d23 and d32 on the other diagonal respectively.

If $a \geq b$ && $a \geq d$ && $c \leq b$ && $c \leq d$, or
$a \leq b$ && $a \leq d$ && $c \geq b$ && $c \geq d$, the comparison module 111 determines that the image region formed by the four pixel dots is a flat region, and the gradient direction is the diagonal direction formed by the two pixel dots d22 and d33.

If $b \geq a$ && $b \geq c$ && $d \leq a$ && $d \leq c$, or
$b \leq a$ && $b \leq c$ && $d \geq a$ && $d \geq c$, the comparison module 111 also determines that the image region formed by the four pixel dots is a flat region, and the gradient direction is the diagonal direction formed by the two pixel dots d23 and d32.

The triangle determination module 12 selects a triangle with this diagonal as its edge to be the triangle for interpolation according to the position of the interpolation point and the diagonal determined as the gradient direction. For example, the comparison module 111 determines the diagonal direction formed by the two pixel dots d22 and d33 as the gradient direction, so the triangle determination module 12 selects the triangle formed by the pixel dots d32, d22 and d33 or the triangle formed by the pixel dots d23, d22 and d33 as the triangle for interpolation, if the interpolation point P is in the triangle formed by the pixel dots d32, d22 and d33, the triangle determination module 12 selects the triangle formed by the pixel dots d32, d22 and d33 as the triangle for interpolation. For example, the comparison module 111 determines the diagonal direction formed by the pixel dots d23 and d32 as the gradient direction, so the triangle determination module 12 selects a triangle formed by the pixel dots d22, d23 and d32 or a triangle formed by the pixel dots d33, d23 and d32 as the triangle for interpolation, and if the interpolation point P is in the triangle formed by the pixel dots d22, d23 and d32, the triangle determination module 12 selects the triangle formed by the pixel dots d22, d23 and d32 as the triangle for interpolation.

The calculation module 13 calculates the pixel value of the interpolation point based on pixel values of pixel dots corresponding to three vertexes of the determined triangle and a distance from the interpolation point to one vertex of the triangle. Preferably, as shown in FIG. 5, the calculation module 13 calculates a pixel value zout of the interpolation point according to the following formula:

$$zout=p0-(-p1+p0)*x-(p0-p2)*y,$$

wherein p0, p1, p2 are pixel values of pixel dots corresponding to three vertexes of a triangle for interpolation, x and y are the horizontal distance and the vertical distance from the interpolation point to the pixel dot having the pixel value of p0.

Hereinafter, the working process of image interpolation based on matrix according to another embodiment of the present invention is described based on the image processing system in FIG. 11.

Specifically, the process of the image processing system obtaining the pixel values of the pixel dots has been described in the forgoing embodiment, which is included in this embodiment in the manner of reference, so the details will not be described again.

The comparison module 111 determines that the situation does not exist that the pixel value of one of the two pixel dots on one diagonal is greater than the pixel values of two pixel dots on the other diagonal, and the other pixel value is smaller than the pixel values of the two pixel dots on the other diagonal, the comparison module 111 determines that the image region formed by the four pixel dots is a non-flat region.

For example, it is still set a=the pixel value of the pixel dot d22, c=the pixel value of the pixel dot d33,
b=the pixel value of the pixel dot d23, and d=the pixel value of the pixel dot d32,
the comparison module 111 determines that if none of the following conditions can be satisfied:
a>=b && a>=d && c<=b && c<=d, or;
a<=b && a<=d && c>=b && c>=d, or;
b>=a && b>=c && d<=a && d<=c, or;
b<=a && b<=c && d>=a && d>=c;
the comparison module 111 determines that the image region formed by the four pixel dots is a non-flat region.

The comparison module 111 compares the pixel value of each of the pixel dots adjacent to the interpolation point with pixel values of pixel dots adjacent to the pixel dot in the horizontal direction and the vertical direction to determine the gradient direction.

The triangle determination module 12 and the calculation module 13 have been described in the embodiment shown in FIG. 10, which are included in this embodiment in the manner of reference, so the details will not be described again.

Hereinafter, the working process of image interpolation based on matrix according to another embodiment of the present invention is described based on the image processing system shown in FIG. 11.

Specifically, the image processing system obtains pixel values of 16 pixels dots contained in a 4×4 pixel dot array, in which an interpolation point is contained. For example, as shown in FIG. 2, the image processing system obtains pixel values of the pixel dots d11, d12, d13, d14, d21, d22, d23, d24, d31, d32, d33, d34, d41, d42, d43 and d44 in a 4×4 pixel dot array correlated to an interpolation point P.

The process that the comparison module 111 determines that an image region formed by four pixel dots adjacent to the interpolation point is a non-flat region has been described in the forgoing embodiment, which is included in this embodiment in the manner of reference, so the details will not be described again.

Next, after the comparison between the respective pixel value of each one of these two pixel dots, which are adjacent to the interpolation point and also on a same diagonal, with the pixel value of its adjacent pixel pots respectively in horizontal and the vertical directions by the comparison module 111, the diagonal direction should be determined by the comparison module 111 as the gradient direction if the comparison results show that both of the following conditions are satisfied: firstly, for one of these two adjacent pixel dots of the interpolation point, a sum of comparison result values in the horizontal and vertical directions is larger than a preset value; and secondly for the other one of these two adjacent pixel dots of the interpolation point, a sum of the comparison result values in the horizontal and vertical directions is still larger than a preset value.

For example, it is defined that an extremum characteristic T is T (Ta, Tb, Tc), in which Tb is the pixel value of a pixel dot adjacent to the interpolation point, Ta and Tc are pixel values of two adjacent pixel dots located respectively in the horizontal or vertical directions of the pixel dot adjacent to the interpolation point.

If Ta>Tb && Tb<Tc, it is determined that the extremum characteristic T is a constant (that is, the comparison result value), for example, T=1; if Ta<Tb && Tb>Tc, it is determined that the extremum characteristic T is a negative value of the constant, for example, T=−1; and in other situations, it is determined that the extremum characteristic T=0.

Thus, the comparison module 111 can obtain extremal eigenvalues, i.e. the comparison result values in the horizontal direction and the vertical directions of the four pixel dots d22, d23, d32 and d33 adjacent to the interpolation point P based on the above definition. For example, as for the pixel dot d22, the comparison module 111 can determine that the extremal eigenvalue of the pixel dot d22 in the horizontal direction is 1, −1 or 0 by comparing the pixel value of the pixel dot d22 with the pixel values of the pixel dots d21 and d23. Similarly, the image processing system can determine the extremal eigenvalue of the pixel dot d22 in the vertical direction by comparing the pixel value of the pixel dot d22 with the pixel values of the pixel dots d12 and d32. As for the pixel dots d23, d32 and d33, the comparison module 111 can also determine the extremal eigenvalues of the pixel dots in the horizontal and vertical directions by comparison in the same manner.

Then, the comparison module 111 determines whether the following condition could be satisfied for both of two pixel dots on the same diagonal: for each one of these two pixel dots, the sum of the extremal eigenvalues of its two adjacent pixel dots respectively in the horizontal and vertical directions is larger than a preset value, for instance, 0. If the condition is satisfied for each one of these two pixel dots, the comparison module 111 determines the diagonal direction as the gradient direction. For example, the extremal eigenvalues in the horizontal direction and the vertical direction of the pixel dots d22, d23, d33 and d32 are respectively defined as infl_a_x, infl_a_y, infl_b_x, infl_b_y, infl_c_x, infl_c_y, infl_d_x and infl_d_y.

If infl_a>0 && infl_c>0, the comparison module 111 determines the diagonal direction formed by the pixel dots d22 and d33 as the gradient direction, wherein infl_a=infl_a_x+infl_a_y and infl_c=infl_c_x+infl_c_y.

If infl_b>0 && infl_d>0, the comparison module 111 determines the diagonal direction formed by the pixel dots d23 and d32 as the gradient direction, in which infl_b=infl_b_x+infl_b_y and infl_d=infl_d_x+infl_d_y.

Those skilled in the art should understand that the comparison result values are merely used for illustrating the present invention, but not intended to limit the present invention. The preset value is determined based on the comparison result values, and when the comparison result values are not expressed as 1, −1 and 0, the preset value may not be 0 accordingly.

The triangle determination module 12 and the calculation module 13 have been described in detail in the forgoing embodiment, which are included in this embodiment in the manner of reference, so the details will not be described again.

Hereinafter, the working process of image interpolation based on matrix according to another embodiment of the present invention is described based on the image processing system shown in FIG. 11.

Specifically, the whole process including obtaining the pixel values of the pixel dots by the image processing system and determining the extremal eigenvalues of the pixel dots in the horizontal direction and the vertical direction by the comparison module 111 have been described in the forgoing embodiments, which are included in this embodiment in the manner of reference, so the details will not be described again.

Next, after comparing the respective pixel value of each one of these two pixel dots, which are adjacent to the interpolation point and also on a same diagonal, with the pixel value of its adjacent pixel pots respectively in horizontal and the vertical directions by the comparison module 111, the determined diagonal direction in the previous interpolation should be determined by the comparison module 111 as current gradient direction if the following condition could not be satisfied; wherein the condition refers to: for each one of these two pixel pots, the sum of its comparison result values in the horizontal and vertical directions is larger than a preset value. If the current interpolation is the initial interpolation in a row, the comparison module 111 may preferably determine the diagonal direction formed by the pixel dots d23 and d32 as the current gradient direction directly. For example, if the gradient direction determined in the previous interpolation is the diagonal direction where the starting pixel dot in an array formed by four pixel dots locates, the comparison module 111 could determine the diagonal direction where the pixel dot d22 (that is, the starting pixel dot in the array) is, that is, the diagonal direction formed by the pixel dots d22 and d33, as the current gradient direction. If the gradient direction determined in the previous interpolation is the other diagonal direction, the comparison module 111 determines the other diagonal, that is, the diagonal direction formed by the pixel dots d23 and d32 as the current gradient direction.

After that, the triangle determination module 12 determines a triangle for interpolation based on the gradient direction determined in the previous interpolation and the position of the interpolation point. For example, the comparison module 111 determines the current gradient direction is the diagonal direction formed by the pixel dots d23 and d32 based on the gradient direction determined in the previous interpolation, and then, the triangle determination module 12 selects a triangle containing the interpolation point P, that is, the triangle formed by the pixel dots d22, d23 and d32 as the triangle for interpolation based on the position of the interpolation point P.

The working process of the calculation module has been described in the forgoing embodiment, which is included in this embodiment in the manner of reference, so the details will not be described again.

Hereinafter, the process of image interpolation based on matrix according to another embodiment of the present invention is described based on the image processing system shown in FIG. 11.

Specifically, the image processing system obtains pixel values of pixel dots contained in a 2×2 pixel dot array. For example, the image processing system obtains pixel values of pixel dots d22, d23, d32, d33.

The comparison module 111 compares the pixel value of each of two pixel dots on the same diagonal with the pixel values of pixel dots on the other diagonal, so as to determine whether an image region formed by the 2×2 pixel dot array is a flat region. The specific comparison process has been described in the forgoing embodiments, so the details will not be described again.

When the comparison module 111 determines that the image region formed by the 2×2 pixel dot array is a flat region, the comparison module 111 determines a diagonal direction as the gradient direction based on pixel values of the four pixel dots, that is, if the pixel value of one of these two pixel dots on the diagonal is larger than the pixel values of two adjacent pixel dots of this pixel dot, and additionally the pixel value of the other pixel dot is smaller than the pixel values of two adjacent pixel dots of that pixel dot, the diagonal direction will be determined by the comparison module 111 as the gradient direction.

When the comparison module 111 determines that the image region formed by the 2×2 pixel dot array is a non-flat region, the image processing system obtains the pixel values of the adjacent pixel dots adjacent for each pixel dot in the 2×2 pixel dot array again, for example, obtains the pixel values of the pixel dots d12, d13, d21, d24, d31, d34, d43 and d44 again.

The comparison module 111 determines extremal eigenvalues in the horizontal and vertical directions of each of the pixel dots in the 2×2 pixel dot array, so as to obtain the sum of the extremal eigenvalue in the horizontal direction and the extremal eigenvalue in the vertical direction of the pixel dot. As for the specific process, reference may be made to the forgoing embodiments, and the details will not be described again.

The comparison module 111 determines whether there are two pixel dots which could satisfy the following two conditions simultaneously: firstly, these two pixel dots are on a same diagonal; and secondly each of them has a sum of the extremal eigenvalues in the horizontal direction and vertical direction larger than a preset value.

Then, if the comparison module 111 determines that there are two pixel dots which could satisfy these two conditions as above mentioned simultaneously, the diagonal direction will be determined as the gradient direction.

Otherwise, if the comparison module 111 determines that there is no such pixel dots which could satisfy these two conditions as above mentioned simultaneously, the gradient direction determined in previous interpolation will be treated as the current gradient direction. As for the specific details, reference may be made to the description in the forgoing embodiments, and the details will not be described again.

After that, the triangle determination module 12 determines a triangle for interpolation in the image region formed by four pixel dots adjacent to the interpolation point based on the determined gradient direction and the position of the interpolation point. As for the specific details, reference may be made to the description in the forgoing embodiments, and the details will not be described again.

At last, the pixel value of the interpolation point is calculated based on the pixel values of pixel dots corresponding to three vertexes of the determined triangle and the distance between the interpolation point and one vertex of the triangle. As for the specific details, reference may be made to the description in the forgoing embodiments, and the details will not be described again.

Compared with the existing image processing method, in the image which has been processed according to the method in the present invention, edge jag or sawteeth of details in an oblique direction of a zoomed image is effectively prevented, and thus a high-quality image is obtained. Moreover, the method of the present invention is implemented through a small number of multiplications. In implementation, as compared with the interpolation based on polyphase filtering in the prior art, in which rows or columns are input first for computation, and then columns or rows are input for computation, the present invention merely needs input of a pixel dot array once before obtaining the pixel value of an interpolation point, resulting in structurally simple computation process.

The above embodiments only illustrate the principles and effects of the present invention in an exemplary manner, but are not intended to limit the present invention. Modifications and variations may be performed by those skilled in the art without departing from the spirit and scope of the present invention. Therefore, the protection scope of the present invention is defined by the claims.

What is claimed is:

1. An image interpolation method based on matrix in an image processing system, comprising steps of:
   (A) determining a gradient direction of an image region formed by a pixel dot array containing an interpolation point, wherein Step (A) further comprises Step (A1) as follows:
      (A1) comparing the pixel value of each pixel dot on a diagonal in the pixel dot array containing the interpolation point with the pixel values of pixel dots on the other diagonal respectively, so as to find out whether the image region formed by the pixel dot array is a flat region to further determine the gradient direction;
   (B) determining a triangle for interpolation in the image region based on the gradient direction and position of the interpolation point; and
   (C) calculating the pixel value of the interpolation point based on the pixel values of pixel dots corresponding to three vertexes of the determined triangle and the distance between the interpolation point and one of three vertexes of the determined triangle.

2. The image interpolation method based on matrix in an image processing system as in claim 1, wherein Step (A1) comprises following step:
   the image processing system comparing the pixel value of each of two pixel dots on the same diagonal and adjacent to the interpolation point, with the pixel values of two adjacent pixel dots on the other diagonal and adjacent to the interpolation point; and determining the image region formed by the pixel dot array as a flat region and determining the gradient direction as the diagonal direction if the following condition is satisfied: the pixel value of one of the two pixel dots on one diagonal is not smaller than the pixel values of two pixel dots adjacent to the interpolation point and on the other diagonal, and the pixel value of the other pixel dot is smaller than the pixel values of the two pixel dots adjacent to the interpolation point and on the other diagonal; and Step (B) comprises following step:
selecting a triangle with this diagonal as its edge to be the triangle for interpolation according to the position of the interpolation point and the diagonal direction.

3. The image interpolation method based on matrix in an image processing system as in claim 1, wherein Step (A1) further comprises steps A11 and A12 as follows:
   (A11) determining the image region formed by the four pixel dots as a non-flat region if the following condition can't be satisfied: the pixel value of one of the two pixel dots on one diagonal is not smaller than the pixel values of two pixel dots adjacent to the interpolation point and on the other diagonal, and the pixel value of the other pixel dot is smaller than the pixel values of the two pixel dots adjacent to the interpolation point and on the other diagonal; and
   (A12) determining the gradient direction by comparing the pixel value of each of the pixel dots adjacent to the interpolation point with the pixel values of its specific adjacent pixel dots both in horizontal and vertical directions.

4. The image interpolation method based on matrix in an image processing system as in claim 3, wherein Step (A12) further comprises following step:
   after comparing the pixel value of each of two pixel dots, which are adjacent to the interpolation point and on a same diagonal, with the pixel values of its specific adjacent pixel dots both in horizontal and vertical directions; determining the diagonal direction as the gradient direction if the comparison results demonstrate that the following condition is satisfied: the sum of the comparison result values in the horizontal and vertical directions of one of these two pixel dots is greater than a preset value, and the sum of the comparison result values in the horizontal and vertical directions of the other pixel dot is also greater than a preset value; and Step (B) comprises following step:
selecting a triangle with this diagonal as its edge to be the triangle for interpolation according to the position of the interpolation point and the diagonal direction.

5. The image interpolation method based on matrix in an image processing system as in claim 3, wherein Step (A12) further comprises following step:
   determining a current gradient direction based on the gradient direction determined in previous interpolation if the following condition can't be satisfied: the sum of the comparison result values in the horizontal and vertical directions of one of these two pixel dots is greater than a preset value, and the sum of the comparison result values in the horizontal and vertical directions of the other pixel dot is also greater than a preset value; and Step (B) further comprises step of:
selecting a triangle for interpolation according to the gradient direction determined in the previous interpolation.

6. The image interpolation method based on matrix in an image processing system as in claim 1, wherein Step (C) comprises following step:

calculating a pixel value zout of the interpolation point according to the following formula:

$$zout=p0-(-p1+p0)*x-(p0-p2)*y,$$

wherein, p0, p1, p2 are pixel values of pixel dots corresponding to three vertexes of the triangle for interpolation, x and y respectively are a horizontal distance and a vertical distance from the interpolation point to the pixel dot having the pixel value of p0.

7. An image interpolation system based on matrix, comprising:
a gradient determination module, for determining a gradient direction of an image region formed by a pixel dot array containing an interpolation point, wherein the gradient determination module comprises:
a comparison module, for comparing a pixel value of each pixel dot on the same diagonal in the pixel dot array containing the interpolation point with pixel values of pixel dots on the other diagonal, so as to determine whether the image region formed by the pixel dot array is a flat region and further determine the gradient direction;
a triangle determination module, for determining a triangle for interpolation in the image region based on the gradient direction and a position of the interpolation point; and
a calculation module, for calculating a pixel value of the interpolation point based on pixel values of pixel dots corresponding to three vertexes of the triangle for interpolation and a distance from the interpolation point to one vertex of the triangle.

8. The image processing system for image interpolation based on matrix as in claim 7, wherein the comparison module is further used for:
comparing the pixel value of each of two pixel dots on the same diagonal and adjacent to the interpolation point, with the pixel values of two adjacent pixel dots on the other diagonal and adjacent to the interpolation point; and determining the image region formed by the pixel dot array is a flat region and determining the gradient direction as the diagonal direction if the pixel value of one of the two pixel dots adjacent to the interpolation point on a same diagonal is not smaller than the pixel values of the two pixel dots adjacent to the interpolation point and on the other diagonal, and the pixel value of the other pixel dot is smaller than the pixel values of the two pixel dots adjacent to the interpolation point and on the other diagonal; and
the triangle determination module is further used for the following procedure:
selecting a triangle with this diagonal as its edge to be a triangle for interpolation according to the position of the interpolation point and the diagonal direction.

9. The image processing system for image interpolation based on matrix as in claim 7, wherein the comparison module is further used for:
determining the image region formed by the pixel dot array as a non-flat region if the following condition can't be satisfied:
the pixel value of one of the two pixel dots adjacent to the interpolation point on a same diagonal is not smaller than the pixel values of the two pixel dots adjacent to the interpolation point and on the other diagonal, and the pixel value of the other pixel dot is smaller than the pixel values of the two pixel dots adjacent to the interpolation point and on the other diagonal; and
further determining the gradient direction by comparing the pixel value of each of two pixel dots, which are both adjacent to the interpolation point on a same diagonal, with the pixel values of its specific adjacent pixel dots both in horizontal and vertical directions.

10. The image processing system for image interpolation based on matrix as in claim 9, wherein the comparison module is further used for:
comparing the pixel value of each of two pixel dots, which are both adjacent to the interpolation point on a same diagonal, with the pixel values of its specific adjacent pixel dots both in horizontal and vertical directions; and determining the diagonal direction as the gradient direction if the comparison results demonstrate that the following condition is satisfied: the sum of the comparison result values in the horizontal and vertical directions of one of these two pixel dots and the sum of the comparison result values in the horizontal and vertical directions of the other pixel dot are both greater than a preset value; and
the triangle determination module is further used for:
selecting a triangle with this diagonal as its edge to be the triangle for interpolation according to the position of the interpolation point and the diagonal direction.

11. The image processing system for image interpolation based on matrix as in claim 9, wherein the comparison module is further used for:
comparing the pixel value of each of two pixel dots, which are both adjacent to the interpolation point on a same diagonal, with the pixel values of its specific adjacent pixel dots both in horizontal and vertical directions; and determining a current gradient direction based on a gradient direction determined in previous interpolation if the comparison results demonstrate that the following condition can't be satisfied: the sum of the comparison result values in the horizontal and vertical directions of one of these two pixel dots and the sum of the comparison result values in the horizontal and vertical directions of the other pixel dot are both greater than a preset value.

12. The image processing system for image interpolation based on matrix as in claim 7, wherein the calculation module is further used for:
calculating a pixel value zout of the interpolation point according to the following formula:

$$zout=p0-(-p1+p0)*x-(p0-p2)*y,$$

wherein p0, p1, p2 are pixel values of pixel dots corresponding to three vertexes of the triangle for interpolation, x and y respectively are a horizontal distance and a vertical distance from the interpolation point to the pixel dot having the pixel value of p0.

* * * * *